(12) United States Patent
Mascianica et al.

(10) Patent No.: US 10,147,986 B2
(45) Date of Patent: Dec. 4, 2018

(54) TRACTION BATTERY ASSEMBLY

(71) Applicant: Ford Global Technologies, LLC, Dearborn, MI (US)

(72) Inventors: Evan Mascianica, Detroit, MI (US); Josef Dollison, Petersburg, MI (US); Jeremy Samborsky, Livonia, MI (US); Daniel Miller, Dearborn, MI (US); Jason Sielaff, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 11 days.

(21) Appl. No.: 14/931,201

(22) Filed: Nov. 3, 2015

(65) Prior Publication Data

US 2017/0125865 A1    May 4, 2017

(51) Int. Cl.
| | | |
|---|---|---|
| *H01M 10/6568* | (2014.01) | |
| *H01M 10/625* | (2014.01) | |
| *H01M 10/613* | (2014.01) | |
| *H01M 2/10* | (2006.01) | |
| *H01M 10/6556* | (2014.01) | |
| *H01M 10/6567* | (2014.01) | |
| *B60L 11/18* | (2006.01) | |
| *H01M 10/653* | (2014.01) | |
| *H01M 2/00* | (2006.01) | |
| *H01M 10/647* | (2014.01) | |

(52) U.S. Cl.
CPC ..... *H01M 10/6568* (2015.04); *B60L 11/1874* (2013.01); *B60L 11/1879* (2013.01); *H01M 2/1077* (2013.01); *H01M 10/613* (2015.04); *H01M 10/625* (2015.04); *H01M 10/6556* (2015.04); *H01M 10/6567* (2015.04); *B60L 11/18* (2013.01); *H01M 2/00* (2013.01); *H01M 2/1094* (2013.01); *H01M 10/647* (2015.04); *H01M 10/653* (2015.04); *H01M 2220/20* (2013.01)

(58) Field of Classification Search
CPC .. H01M 10/60; H01M 10/625; H01M 10/647; H01M 10/6555; H01M 10/6567; H01M 2/00; H01M 10/613; H01M 10/653; H01M 10/617; H01M 10/65; H01M 10/6556; H01M 2/1094; H01M 10/6568; H01M 2/1077; H01M 2220/20; B60L 11/18; B60L 11/1874; B60L 11/1879
USPC ........................................................ 429/72
See application file for complete search history.

(56) References Cited

U.S. PATENT DOCUMENTS

| 6,106,972 A | 8/2000 | Kokubo et al. |
| 8,268,474 B2 | 9/2012 | Kim et al. |
| 2004/0137313 A1 | 7/2004 | Jaura et al. |

(Continued)

FOREIGN PATENT DOCUMENTS

WO    WO2015036828    * 3/2015

*Primary Examiner* — Jonathan G Jelsma
*Assistant Examiner* — Omar M Kekia
(74) *Attorney, Agent, or Firm* — David B. Kelley; Brooks Kushman P.C.

(57) ABSTRACT

A traction battery for a vehicle includes a tray having an outer surface defining an open channel configured to circulate liquid coolant. A plurality of cells are stacked in an array and each has a dielectric material surrounding at least a portion of the cell. The array is disposed on the outer surface and covers the channel such that a side of the array is in direct contact with the coolant during operation.

20 Claims, 3 Drawing Sheets

(56) References Cited

U.S. PATENT DOCUMENTS

| | | | |
|---|---|---|---|
| 2006/0115721 A1* | 6/2006 | Lee | H01M 10/4207 429/156 |
| 2009/0169978 A1* | 7/2009 | Smith | H01M 2/0242 429/82 |
| 2010/0136396 A1 | 6/2010 | Hermann et al. | |
| 2013/0209858 A1* | 8/2013 | Schmitt | H01M 10/0525 429/120 |
| 2015/0221995 A1* | 8/2015 | Robert | H01M 10/625 429/120 |
| 2015/0270586 A1* | 9/2015 | Wang | H01M 2/1077 429/99 |
| 2015/0280183 A1* | 10/2015 | Utley | H01M 2/1016 429/99 |
| 2016/0172727 A1* | 6/2016 | Chan | H01M 10/6557 429/120 |
| 2016/0204487 A1 | 7/2016 | Morioka et al. | |

* cited by examiner

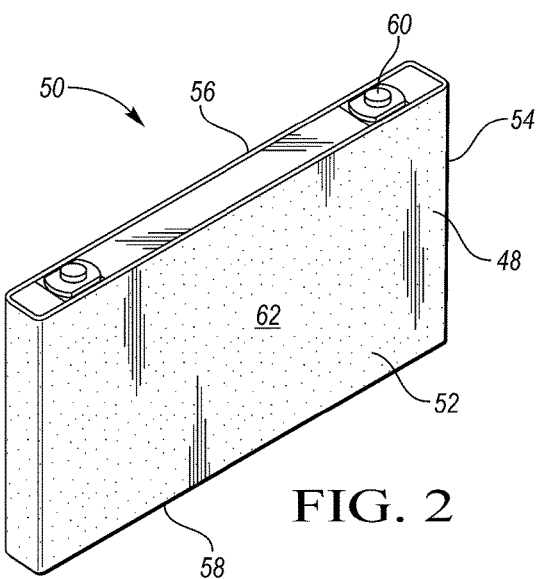
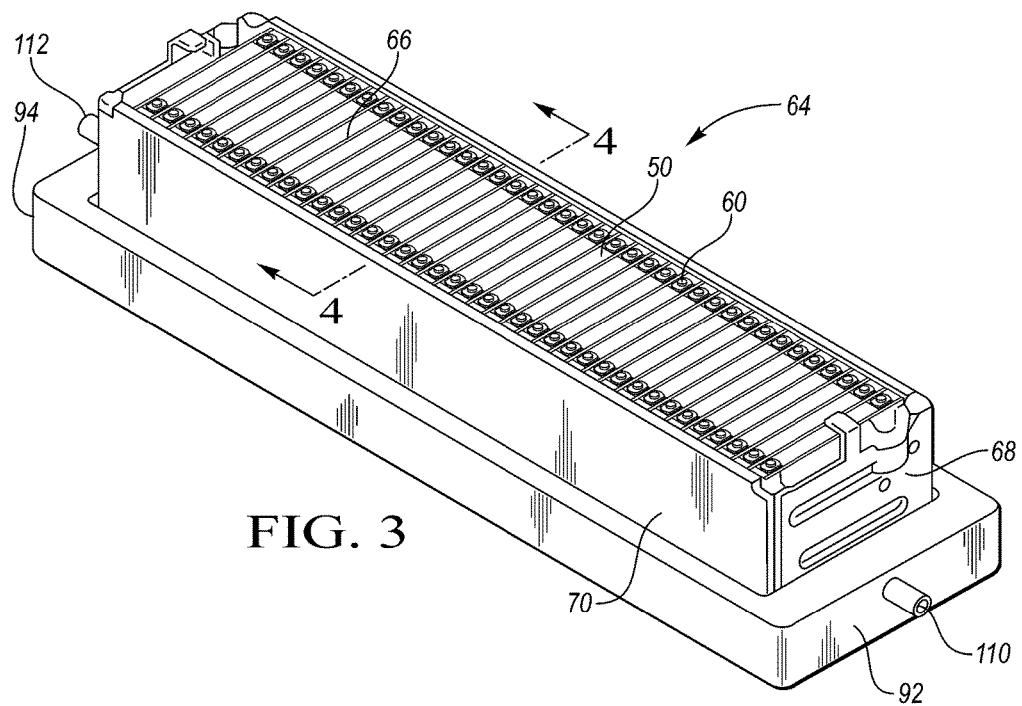

TRACTION BATTERY ASSEMBLY

TECHNICAL FIELD

The present disclosure relates to traction battery assemblies for motor vehicles that thermally regulate cells utilizing contact between a liquid coolant and the cells.

BACKGROUND

Vehicles such as battery-electric vehicles and hybrid-electric vehicles contain a traction battery assembly to act as an energy source for the vehicle. The traction battery may include components and systems to assist in managing vehicle performance and operations. The traction battery may also include high voltage components, and may include an air or liquid thermal-management system to control the temperature of the battery.

SUMMARY

According to one embodiment, a traction battery for a vehicle includes a tray having an outer surface defining an open channel configured to circulate liquid coolant. A plurality of cells are stacked in an array and each has a dielectric material surrounding at least a portion of the cell. The array is disposed on the outer surface and covers the channel such that a side of the array is in direct contact with the coolant during operation.

According to another embodiment, a traction battery for a vehicle includes a manifold having a body defining an open cavity. The traction battery also includes a plurality of cells stacked in an array and disposed on the body such that a side of the array covers the cavity to define a coolant chamber configured to circulate liquid coolant directly across the side of the array.

According to yet another embodiment, a traction battery for a vehicle includes a manifold defining a channel configured to circulate liquid coolant. The traction battery also includes a plurality of cells stacked in an array and each having a dielectric material surrounding at least a portion of the cell. The array is disposed against the manifold and covers the channel such that a side of the array is in direct contact with the coolant during operation.

BRIEF DESCRIPTION OF THE DRAWINGS

FIG. 2 is a perspective view of a prismatic battery cell.

FIG. 3 is a perspective view of a traction battery.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
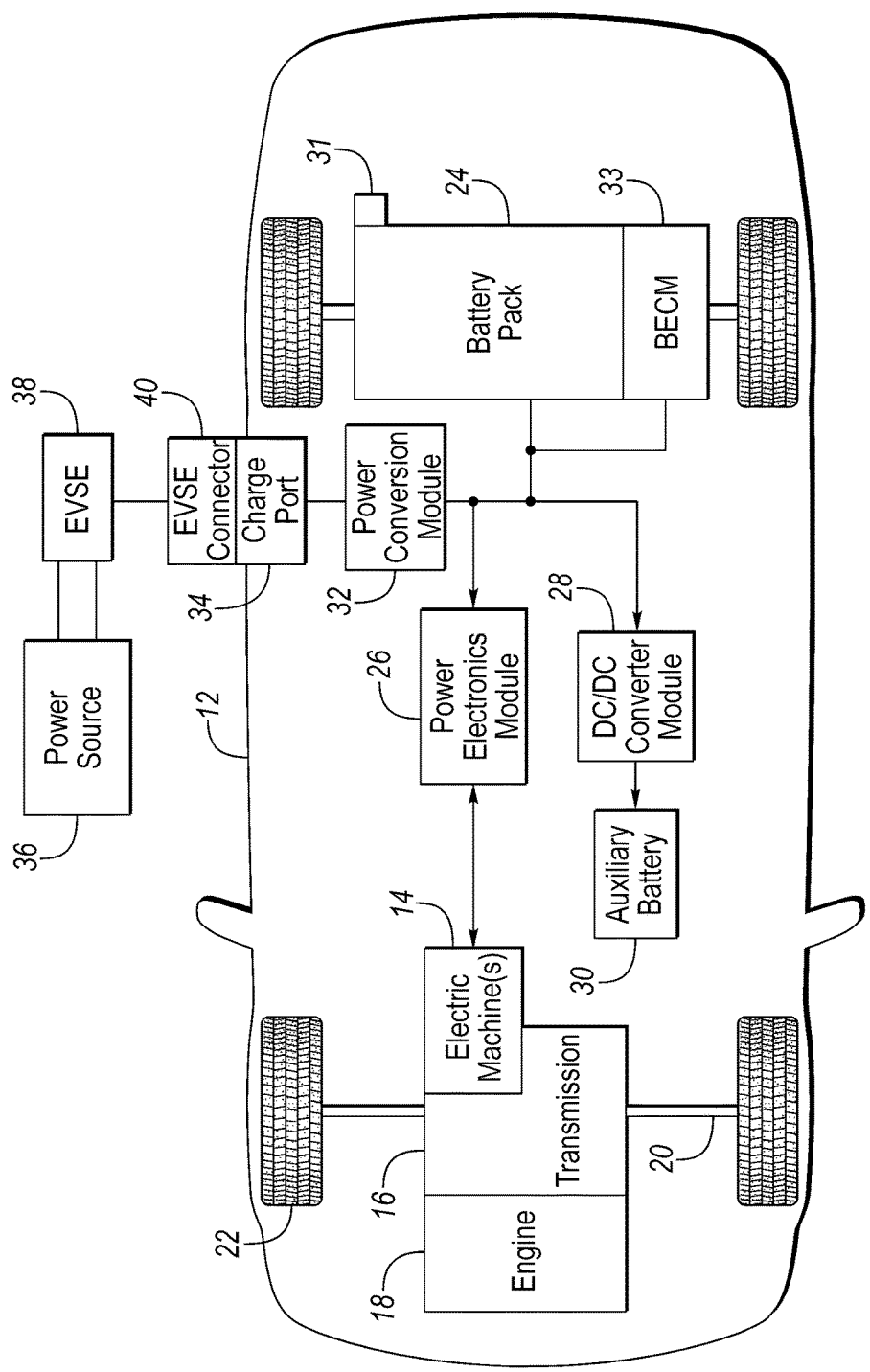
FIG. 1 is a schematic diagram of an example hybrid vehicle.

FIG. 1 depicts a schematic of a typical plug-in hybrid-electric vehicle (PHEV). Certain embodiments, however, may also be implemented within the context of non-plug-in hybrids and fully electric vehicles. The vehicle 12 includes one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy through regenerative braking. The electric machines 14 reduce pollutant emissions and increase fuel economy by reducing the work load of the engine 18.

A traction battery or battery pack 24 stores energy that can be used by the electric machines 14. The traction battery 24 typically provides a high-voltage direct current (DC) output from one or more battery cell arrays, sometimes referred to as battery cell stacks, within the traction battery 24. The battery cell arrays may include one or more battery cells.

The battery cells, such as a prismatic, pouch, cylindrical, or any other type of cell, convert stored chemical energy to electrical energy. The cells may include a housing, a positive electrode (cathode) and a negative electrode (anode). An electrolyte may allow ions to move between the anode and cathode during discharge, and then return during recharge. Terminals may allow current to flow out of the cell for use by the vehicle.

Different battery pack configurations may be available to address individual vehicle variables including packaging constraints and power requirements. The battery cells may be thermally regulated with a thermal management system. Examples of thermal management systems include air-cooling systems, liquid-cooling systems and a combination of air-and-liquid systems.

The traction battery 24 may be electrically connected to one or more power electronics modules 26 through one or more contactors (not shown). The one or more contactors isolate the traction battery 24 from other components when opened and connect the traction battery 24 to other components when closed. The power electronics module 26 may be electrically connected to the electric machines 14 and may provide the ability to bi-directionally transfer electrical energy between the traction battery 24 and the electric machines 14. For example, a typical traction battery 24 may provide a DC voltage while the electric machines 14 may require a three-phase alternating current (AC) voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a fully electric vehicle. In a fully electric vehicle, the hybrid transmission 16 may be a gear box connected to an electric machine 14 and the engine 18 is not present.

In addition to providing energy for propulsion, the traction battery 24 may provide energy for other vehicle electrical systems. A typical system may include a DC/DC converter module 28 that converts the high-voltage DC output of the traction battery 24 to a low-voltage DC supply that is compatible with other vehicle components. Other high-voltage loads, such as compressors and electric heaters, may be connected directly to the high-voltage supply without the use of a DC/DC converter module 28. In a typical vehicle, the low-voltage systems are electrically connected to an auxiliary battery 30 (e.g., a 12 volt battery).

A battery energy control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24.

The vehicle 12 may be recharged by a charging station connected to an external power source 36. The external power source 36 may be electrically connected to electric vehicle supply equipment (EVSE) 38. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via dedicated electrical conduits.

FIGS. 2 through 5 and the related discussion describe examples of the traction battery assembly 24. Referring to FIG. 2, a battery cell 50 may be a prismatic cell having a can 48 defining major sides 52, minor sides 54, a terminal side 56, and a bottom side 58 that are interconnected along intersecting edges. The terminal side 56 includes one or more terminals 60 that may extend upwardly from the terminal side 56 allowing the terminals to be electrically and mechanically connected to busbars. The can 48 may be at least partially surrounded by a dielectric material 62. In the illustrated example, all of the sides of the cell 50 except for the terminal side are covered by the dielectric material 62. The dielectric material 62 prevents the electrically conductive cell from creating an electrical connection with unintended objects, such as adjacent cells. The dielectric material may be a pouch, a film wrapping, a paste, grease, tape, or similar item.

Figure 4:
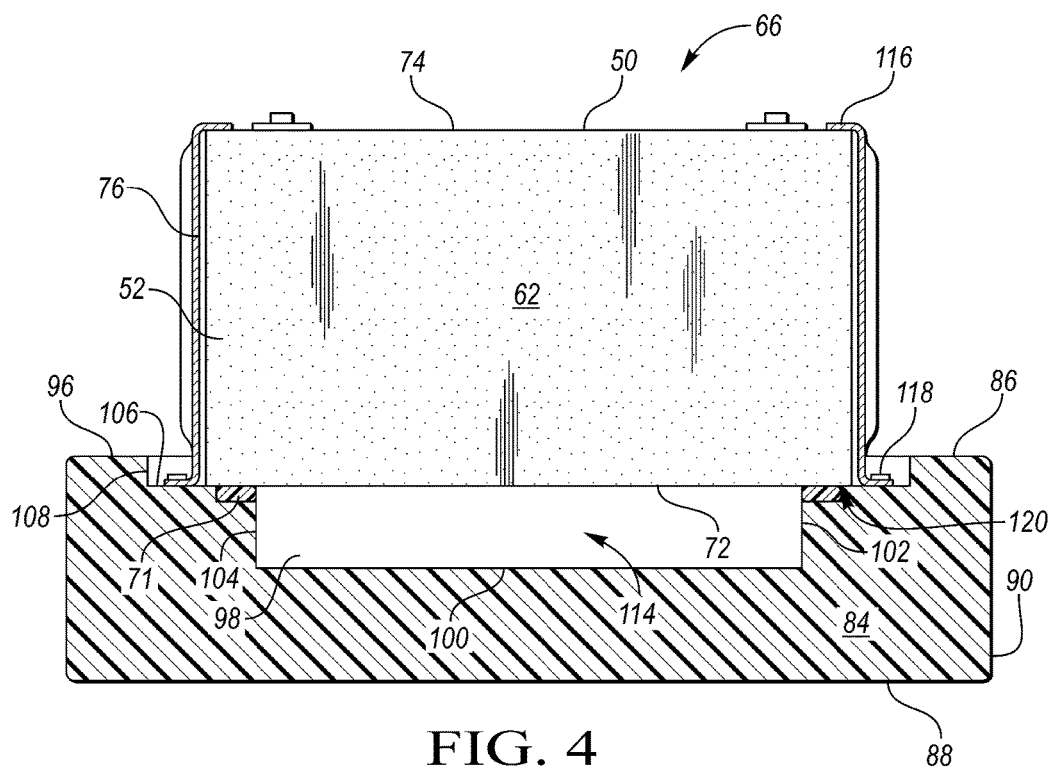
FIG. 4 is a front view, in cross section, of the traction battery along cut line 4-4.

Referring to FIGS. 3 and 4, an example traction battery 64 includes a plurality of cells, such as cells 50, stacked in a cell array (stack) 66. The cells 50 are arranged in the array 66 such that the major sides 52 of adjacent cells face each other.

A spacer (not shown) may be disposed between adjacent cells. The cells 50 are held in the array 66 by a pair of endplates 68 and bracketry 70 that connects the pair of endplates together. The endplates 68 and bracketry 70 cooperate to provide compression to the cells 50. The compression force applied may be between 0.5 to 4 kilo newtons (kN). The compression provided by the bracketry 70 and endplates 68 creates a liquid-tight seal between the major sides 52 of adjacent cells. A sealant may be applied between each of the cells to increase the robustness of the water-tight seal between each of the cells. The sealant may be a gasket, silicone (such as room temperature vulcanizing (RTV) sealant), a paste, adhesive, or a thermal-interface material (TIM). The dielectric material 62 may be configured to help create a liquid-tight seal between the cells. The array 66 may be arranged such that the bracketry 70 is in contact with the minor sides 54 of the cells and the endplates 68 are each in contact with a major side 52 of one of the first or last cells in the stack 56. The bracketry 70 may be a planar sheet (as shown) or may be a plurality of rod-like members. The array 66 may include a bottom side 72, a top side 74, and longitudinal sidewalls 76.

The fraction battery 64 also includes a tray 84 and a cooling unit or manifold. In some embodiments (such as the one shown in FIGS. 3 and 4), the tray and manifold are a single component designed to accomplish both tasks. In the illustrated embodiment, the tray 84 is on the bottom of the traction battery 64 and supports the array 66. In other embodiments, the tray 84 may be on one of the sides 76, or on the top 74, of the array 66. The tray 84 includes a top 86, a bottom 88, longitudinal sidewalls 90, a front wall 92, and a back wall 94 interconnected to define a body. (It is to be understood that the terms "top," "bottom," etc. are for descriptive convention and that the battery may be packaged in a multitude of different orientations on the vehicle.) The top 86 has an outer surface 96 that defines an open channel 98 recessed into the top 86. The open channel 98 may extend longitudinally along a majority of the length of the tray 84, and extend laterally along a majority of the width of the tray 84. The size of the channel 98 may approximate the size of the bottom 72 (or other side depending on the embodiment) of the array 66, albeit slightly smaller. The open channel 98 includes a bottom 100 and sidewalls 102, which define the boundaries of the channel 98. Some of the sidewalls 102 (of the illustrated embodiment) may be stepped to include a lower vertical face 104, a ledge 106, and an upper vertical face 108. The front wall 92 may define an inlet port 110 in fluid communication with the open channel 98, and the back wall 94 may define an outlet port 112 in fluid communication with the open channel 98. In other embodiments, the ports may both be located on the same sidewall. In the illustrated embodiment, coolant flows through the channel 98 from the front wall 92 to the back wall 94 (or vise-versa). But, in other embodiments, the channel may include a center divider and the coolant may flow in a U-shaped pattern entering and exiting from ports located on a common wall.

The array 66 is connected to the tray 84 such that the array 66 covers over the open channel 98 to define a coolant chamber 114. The coolant chamber 114 is configured to circulate a liquid coolant (such as ethylene glycol) between the inlet port 110 and the outlet port 112 to thermally regulate the cells 50. The coolant chamber 114 is defined by the cooperation between the tray 84 and the bottom side 72 of the array 66. Thus, the bottom side 72 of the array (which is composed of a collection of the bottoms of each of the cells) is in direct contact with the liquid coolant used herein, the term "direct contact" covers situations where the liquid coolant contacts the can of the cell and covers situations where the liquid coolant contacts the dielectric cover. During operation, a relatively cold coolant is circulated across the bottom of each of the cells to remove heat from the array 66 to maintain the cell temperatures within a desired range. The traction battery 64 may also be configured to heat the cells by circulating a relatively warm coolant across the bottom of each of cells 50 to add heat to the array 66.

Having the liquid coolant in direct contact with the cells reduces the thermal resistance of the cooling system compared to traditional cold plate designs by eliminating the thermal resistance of the cold-plate top and the thermal resistance of the TIM from the system. This creates a more efficient heat transfer between the cells and the coolant compared to traditional designs.

In the illustrated embodiment, the bottom side 72 of the array 66 is disposed on the ledge 106. The bracketry 70 may include a hook 116 that grabs the terminal side 56, and a foot 118 that is mechanically fastened to the ledge 106 to attach the array 66 to the tray 84. Alternatively, the array 66 may be secured to the tray 84 via adhesive, or a combination of adhesive and mechanical fasteners. The interface 120 between the array 66 and the tray 84 must be liquid-tight to prevent coolant from leaking out of the cooling chamber 114. To prevent leakage, a sealant 71 may be applied at the interface 120. The sealant may be a gasket, silicone (such as room temperature vulcanizing (RTV) sealant), a paste, adhesive, or the like.

Figure 5:
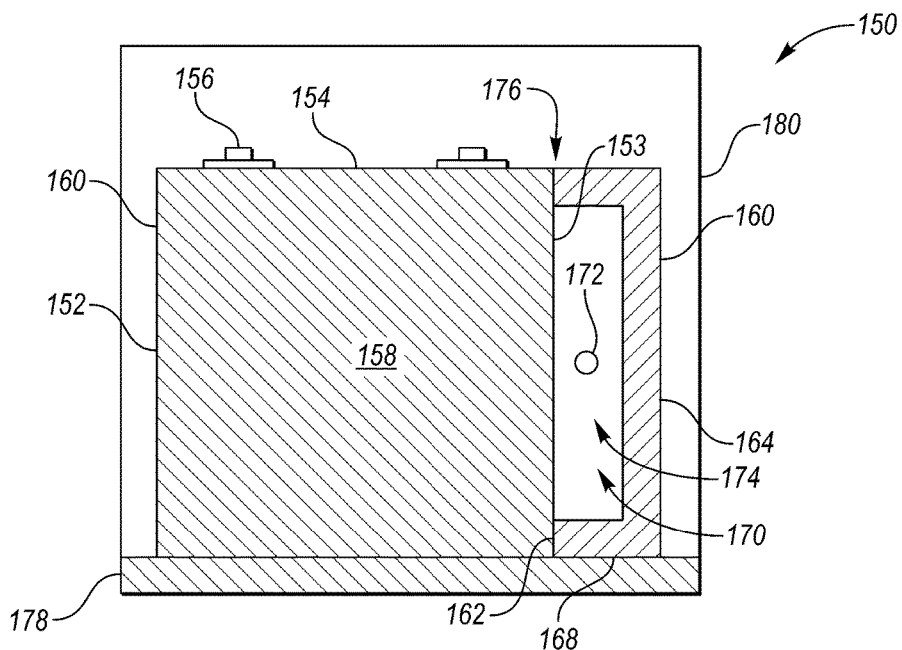
FIG. 5 is a front view, in cross section, of another traction battery.

Referring to FIG. 5, another traction battery 150 includes a battery array 152 including a plurality of cells 154. Each of the cells includes major sides 158, minor sides 160, and a terminal side having at least one terminal 156 disposed thereon. The cells are arranged in the array 152 such that the major sides 158 are disposed against each other. Each of the cells 154 may include a dielectric material that surrounds at least a portion of the cell. The dielectric material may be similar to that described above. The cells 154 are tightly held together by endplates and cooperating brackets creating a liquid tight seal between each of the cells 154.

A manifold 160 is disposed against a longitudinal side 153 of the array 152. The manifold includes an inner side 162 that is in contact with the longitudinal side 153, and an outer side 164 that faces away from the array. The manifold 160 also includes a top 166 and a bottom 168. The manifold 160 defines an open channel 170 configured to carry a liquid coolant across the longitudinal side 153 of the array. One or more sides of the manifold 160 defines a port 172 allowing coolant to flow into or out of the channel 170 depending upon the type of port. For example, illustrated port 172 may be an inlet port and the manifold may include an outlet port (not shown) on the other end of the manifold.

The array 152 is connected to the manifold 160 such that the array covers over the open channel 170 to define a coolant chamber 174. The coolant chamber 174 is configured to circulate a liquid coolant (such as ethylene glycol) between the inlet port and the outlet port to thermally regulate the cells 154. The coolant chamber 174 is defined by the cooperation between the manifold 160 and the side 153 of the array 152. Thus, the side 153 of the array (which is composed of a collection of the minor sides 160 of each of the cells) is in direct contact with the liquid coolant. During operation, a relatively cold coolant is circulated across the minor side 160 of each of the cells to remove heat from the array to maintain the cell temperatures within a desired range. The traction battery 150 may also be configured to heat the cells by circulating a relatively warm coolant across each of cells to add heat to the array.

The interface 176 between the array 152 and the manifold 160 must be liquid-tight to prevent coolant from leaking out of the cooling chamber 174. To prevent leakage, a sealant may be applied at the interface 176. The sealant may be a gasket, silicone (such as RTV), a paste, adhesive, or the like. The array 152 and manifold 160 may be connected together with fastener, adhesive, or both.

The battery 150 also includes a tray 178 that supports the array 152, the manifold 160, and other ancillary components not shown. The tray 178 includes a first side 180. The battery array 152 and the bottom 168 of the manifold 160 may be attached to the first side 180 via fasteners, adhesives, or both. A cover 180 may be disposed over the array 152 and the manifold 160, and attached to the tray 178 to enclose the battery. The cover 180 and the tray 178 may cooperate to form a battery case 182.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A traction battery for a vehicle comprising:
   a tray including a top defining a recessed open channel; and
   cells stacked in an array and each including a dielectric pouch that receives the cell, wherein a bottom of the array is disposed on the top covering the channel to form a chamber configured to circulate liquid coolant, the bottom forming a ceiling of the chamber that is in direct contact with the coolant during operation.

2. The traction battery of claim 1 wherein the tray further includes a sidewall defining a port in fluid communication with the channel.

3. The traction battery of claim 1 further comprising sealant disposed around a perimeter of the channel and sandwiched between the array and the tray to prevent the coolant from leaking.

4. The traction battery of claim 3 wherein the sealant is a gasket or silicone.

5. The traction battery of claim 1 further comprising endplates sandwiching the array and bracketry connected between the endplates, wherein the endplates and bracketry cooperate to compress the cells creating a liquid-tight seal between adjacent cells.

6. The traction battery of claim 1 further comprising sealant disposed between each of the cells creating a liquid-tight seal between adjacent cells.

7. The traction battery of claim 1 further comprising a cover encasing the array and connected to the tray, wherein the tray and the cover cooperate to define a battery case.

8. A traction battery for a vehicle comprising:
   a manifold including a body defining an open cavity recessed therein; and
   a plurality of cells stacked in an array and disposed on the body such that a side of the array covers the cavity and cooperates with the open cavity to define a coolant chamber configured to circulate liquid coolant directly across the side of the array.

9. The traction battery of claim 8 wherein each of the cells is at least partially surrounded by a dielectric material.

10. The traction battery of claim 8 further comprising sealant disposed around a perimeter of the cavity and sandwiched between the array and the body to prevent the coolant from leaking.

11. The traction battery of claim 10 wherein the sealant is a gasket or silicone.

12. The traction battery of claim 8 further comprising endplates sandwiching the array and bracketry connected between the endplates, wherein the endplates and bracketry cooperate to compress the cells creating a liquid-tight seal between adjacent cells.

13. The traction battery of claim 8 further comprising sealant disposed between each of the cells creating a liquid-tight seal between adjacent cells.

14. The traction battery of claim 8 further comprising a tray supporting the manifold and the array.

15. A traction battery for a vehicle comprising:
   a manifold defining a channel configured to circulate liquid coolant; and
   a plurality of cells stacked in an array and each including a dielectric material surrounding at least a portion of the cell, wherein a side of the array is disposed against the manifold and covers the channel such that the side cooperates with the channel to define a coolant chamber and the side is in direct contact with the coolant during operation.

16. The traction battery of claim 15 wherein the manifold defines at least one port in fluid communication with the channel.

17. The traction battery of claim 15 further comprising sealant disposed around a perimeter of the channel and sandwiched between the array and the manifold to prevent the coolant from leaking.

18. The traction battery of claim 17 wherein the sealant is a gasket or silicone.

19. The traction battery of claim 15 further comprising sealant disposed between each of the cells creating a liquid-tight seal between adjacent cells.

20. The traction battery of claim 15 wherein the channel is a recessed open channel.

* * * * *